(12) United States Patent
Jewell et al.

(10) Patent No.: US 7,075,564 B1
(45) Date of Patent: Jul. 11, 2006

(54) VIDEO CONFERENCING INTERFACE

(75) Inventors: Douglas L. Jewell, Paradise, UT (US); Paul D. Israelsen, North Logan, UT (US); David Perkes, North Logan, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 09/762,074

(22) PCT Filed: Jul. 27, 1999

(86) PCT No.: PCT/US99/16995

§ 371 (c)(1),
(2), (4) Date: Jan. 29, 2001

(87) PCT Pub. No.: WO00/07371

PCT Pub. Date: Feb. 10, 2000

Related U.S. Application Data

(60) Provisional application No. 60/094,646, filed on Jul. 30, 1998.

(51) Int. Cl.
*H04N 7/14* (2006.01)

(52) U.S. Cl. ............... 348/14.01; 348/14.08; 348/4.09

(58) Field of Classification Search .. 348/14.01–14.03, 348/14.08–14.1, 14.11–14.14, 443, 454, 460, 348/461; 709/204–205; 345/753; 379/93.21, 379/98.17, 202.01; 370/260–265; 715/753
See application file for complete search history.

(56) References Cited

U.S. PATENT DOCUMENTS

| | | | |
|---|---|---|---|
| 5,367,331 A | | 11/1994 | Secher et al. |
| 5,457,780 A | | 10/1995 | Shaw et al. |
| 5,475,421 A | * | 12/1995 | Palmer et al. ............. 348/14.1 |
| 5,539,452 A | * | 7/1996 | Bush et al. .............. 348/14.13 |
| 5,563,649 A | * | 10/1996 | Gould et al. ............. 348/14.13 |
| 5,802,281 A | * | 9/1998 | Clapp et al. ................ 709/228 |
| 5,821,987 A | * | 10/1998 | Larson .................... 348/14.15 |
| 5,825,408 A | | 10/1998 | Yuyama et al. ......... 348/14.01 |
| 5,926,208 A | | 7/1999 | Noonen et al. .......... 348/14.13 |
| 5,949,474 A | | 9/1999 | Gerszberg et al. ....... 348/14.01 |
| 5,974,464 A | * | 10/1999 | Shin et al. .................. 709/231 |
| 6,124,882 A | * | 9/2000 | Voois et al. ............. 348/14.08 |
| 6,141,032 A | * | 10/2000 | Priest ...................... 348/14.13 |
| 6,215,515 B1 | * | 4/2001 | Voois et al. ............. 348/14.01 |
| 6,243,129 B1 | * | 6/2001 | Deierling ................... 725/105 |

FOREIGN PATENT DOCUMENTS

| | | | |
|---|---|---|---|
| JP | 01252087 A | * | 10/1989 |
| JP | 401252087 A | | 10/1989 |
| JP | 402039693 A | | 2/1990 |
| JP | 402094860 A | | 4/1990 |

(Continued)

OTHER PUBLICATIONS

Severance, Linking Computers and Consumer Electronics, Feb. 1997.

(Continued)

*Primary Examiner*—Melur Ramakrishnaiah
(74) *Attorney, Agent, or Firm*—Traskbritt, P.C.

(57) ABSTRACT

A video conferencing circuit (12) is configured to receive an input (26) from one of a plurality of video input devices. The video signal is then stored, compressed and transmitted by an interface circuit such as a modem (18). Video signals from a remote location are received from the modem (18), decompressed, stored and then transferred for display on one of a plurality of video output devices.

13 Claims, 7 Drawing Sheets

| | FOREIGN PATENT DOCUMENTS | |
|---|---|---|
| JP | 404150686 A | 5/1992 |
| JP | 08307514 A * | 11/1996 |
| JP | 408307514 A | 11/1996 |
| JP | 410065655 A | 3/1998 |
| WO | WO 96/08110 | 3/1996 |
| WO | WO 98/19244 A1 | 5/1998 |
| WO | WO 96/32717 | 10/1998 |

OTHER PUBLICATIONS

Bloks, Delivering Digital Video Over IEEE 1394, Apr. 1997.
European Search Report, Jun. 25, 2004.

* cited by examiner

VIDEO CONFERENCING INTERFACE

This application claims the benefit of U.S. Provisional Application No. 60/094,646, filed 30 Jul. 1998.

TECHNICAL FIELD

This invention relates to video conferencing systems and, more specifically, to a system which interfaces with one or more of a plurality of video input and one or more of a plurality of output devices.

BACKGROUND

Video conferencing systems are typically designed for use with one particular type of video input device, such as an NTSC camera ("NTSC" means the North American and Japanese analog video standard), a PAL camera ("PAL" means the European analog video standard), a digital camera, or a high speed serial interface camera (e.g., a FireWire or Universal Serial Bus (USB) camera). Such systems are also typically designed for use with one particular output device, such as an NTSC or PAL video monitor, a television set, a Liquid Crystal Display (LCD) screen, or a computer monitor.

Systems having an interface for video conferencing systems that allow the users or manufacturers of such systems to intermingle video input and output devices as they choose, or as a particular video conferencing application dictates, rather than being required are not known. That is, existing systems are believed to require a particular video input device and a particular output device dictated by the video signal formal for the selected video conferencing system.

DISCLOSURE OF INVENTION

A video conferencing interface is part of a standards-based video conferencing system with excellent video and audio quality, high compression, and great flexibility, all at a low cost. The interface includes an Application Specific Integrated Circuit (ASIC) that incorporates a unique blend of computation and data path designs implemented in hardware, as well as processing and control developed for flexibility using a standard processor.

The "hybrid" method of computation and control available in the disclosed system provides an advantage over "single solution" counterparts in which computation and control is implemented in dedicated hardware only. The use of dedicated hardware only leads to relative inflexibility in bit rate control. The "hybrid" method of computation and control in the disclosed system provides and an advantage over counterparts that use a software-programmed processor only, thereby abandoning the speed advantages of a hardware implementation.

The disclosed system employs hardware to implement or provide for computation and for a data path to provide for high speed data processing at a much faster rate than could be done in a processor-only environment (i.e., software). A standard software based processor allows for flexibility of control so the system can be made adaptable for several different configurations. However, the result is a slower speed because of the software configuration. To attain higher speeds using hardware, a separate hardware configuration would be needed for each variation needed leading to considerable cost and complexities for implementation.

For example, it is often desirable to control the bit rate at which the system interface processes images so an appropriate balance can be struck between the quality of the images processed, on the one hand, and the speed with which images are processed, on the other hand. When rapid motion occurs in the processed images, for example, it is typically desirable to operate at an increased bit rate so that the rapid motion is quickly processed and communicated. However, the high speed processing negatively impacts image quality. When the images to be processed are relatively static from image to image (e.g., frame to frame), it typically is desirable to operate at a reduced bit rate, but with increased image quality. In a hardware-only implementation, such flexibility would have to be hardwired at greater expense, or would simply be unavailable. In a software-only implementation, flexibility is maintained, but at the expense of reduced processing speed. The present invention employs a "hybrid" approach, heretofore unknown, to secure the benefits of a fixed hardware and a fixed software solution.

In the described embodiment of the present invention, the ASIC is the key to implementing this hybrid approach. The ASIC provides a hardwired implementation for computation and data movement while also providing the flexibility inherent in processor-based processing and control.

In addition to the ASIC, the system incorporates a memory to store the video information as it is being compressed and/or displayed. The system also includes memory and Electrically Erasable Programmable Read Only Memory (EEPROM) for instructions and data storage for the processor, audio input and output, and a MOdulator/DE-Modulator (MODEM) for telephone/network interface. (The EEPROM and MODEM are actually optional depending on the configuration requirements.)

The ASIC also includes several interfaces that are flexible in their function that allow for several different system configurations with minimal modification or cost impact. These interfaces include the video input, the video output, and the high speed serial interface.

BEST MODES FOR CARRYING OUT THE INVENTION

Figure 1:
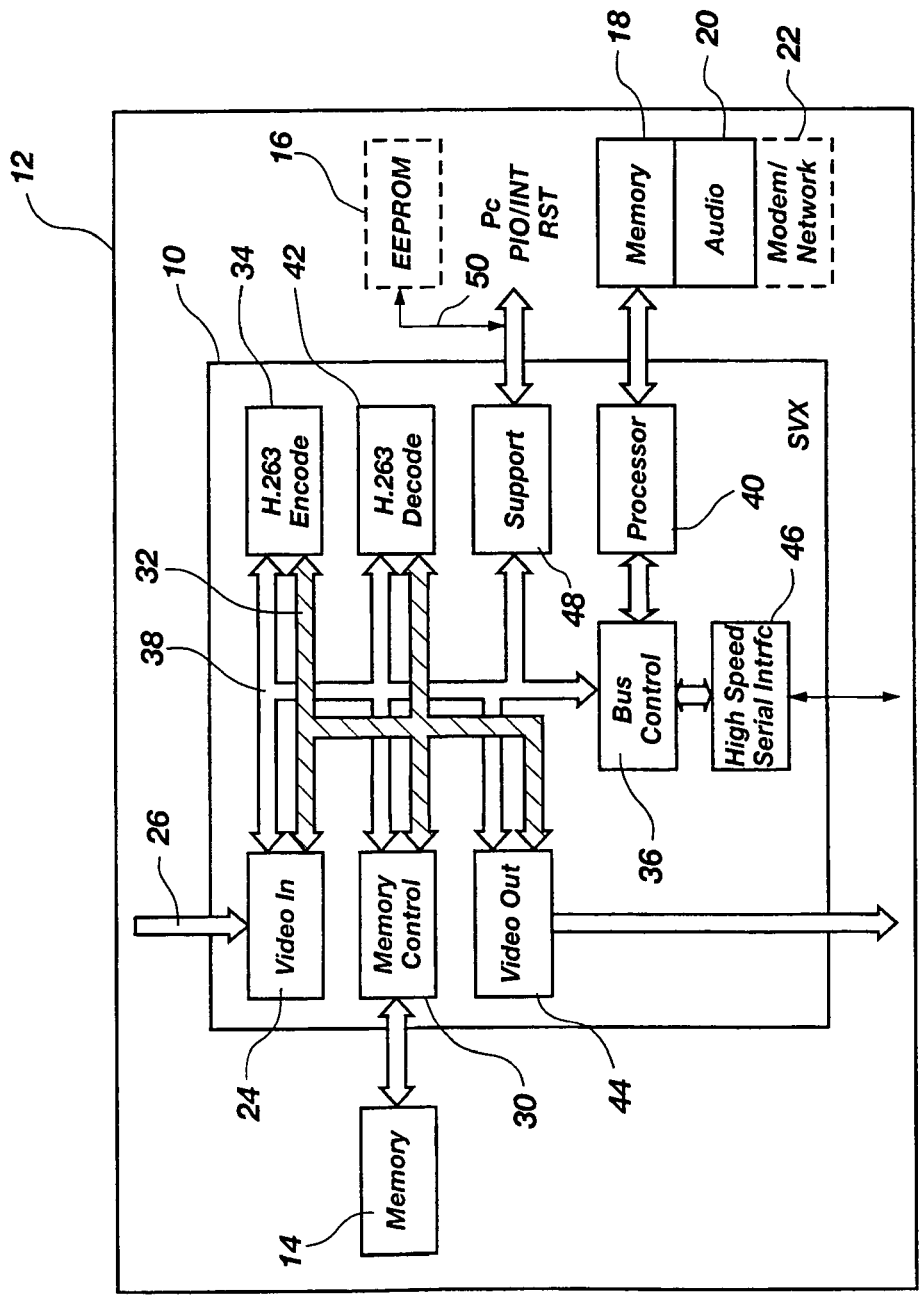
FIG. 1 is a block diagram depiction of a basic ASIC of the prior art suitable for use in processing video signals.

As shown in FIG. 1, a conventional ASIC 10 may be included on a circuit board 12. The circuit board 12 includes a memory 14 connected to a Memory Control 30 forming a memory module 15 that functions to retain video signals. Memory 14 may be implemented as a dynamic random access memory (DRAM), a static random access memory (SCRAM), or other suitable memory device architecture known by persons skilled in the art.

The circuit board 12 may also have an optional EEPROM module 16. A separate processor memory module 18 (e.g., SCRAM DRAM, etc.) along with an audio input/output (I/O) module 20 (connected, for example, to a microphone or speaker), and a MODEM and/or Network interface (e.g., LAN or local area network interface) module 22 which together function as a remote video interface circuit 19 may also be included on the circuit board 12.

In one operational configuration, Video-In circuitry 24 receives digital video signals 26 from a single or selected video signal source. "H.263" is a video compression/decompression standard established by the International Telecommunications Union (ITU). H.263 Encode circuitry 34 directs the Memory Control circuitry 30 to forward stored digital video data sent to it from the video memory module 15. The Memory Control circuitry 30 sends the stored video data that it receives out onto and along the memory bus 32. As the H.263 Encode circuitry 34 encodes (i.e., compresses) the stored digital video data, it passes the now encoded digital video data to a MODEM or a Network module 22 for transmission to a remote station (not shown) at which location the digital video data may be decoded and subsequently displayed for viewing by a user. The remote station may include the inventive video conferencing interface described herein, or it may be a conventional video conferencing system interface.

Encoded digital video data is transmitted by and also received from the remote station or another station through the MODEM or the Network 22. The MODEM or the Network 22 transmit and receive data. If a MODEM is used, the signal is modulated and or demodulated and transmitted over an appropriate line such a telephone line or any equivalent thereof. Alternately, it may be transmitted through a network wiring arrangement which is configured to provide video signal transmission.

The data received from the remote location through a MODEM, a network or what ever else may be extant, is transferred through the Processor circuitry 40 to the Bus Control circuitry 36. The Bus Control Circuitry 36 passes the data over the data bus 38 to H.263 Decode circuitry 42 for decoding. After decoding the digital video data, the H.263 Decode circuitry 42 forwards the decoded digital video data to the Memory Control circuitry 30 over the memory bus 32 for storage in the DRAM 14. Video Out circuitry 44 then directs the Memory Control circuitry 30 to retrieve the stored digital video data from the DRAM 14 for output by the Video Out circuitry 44 in digital form for display by a selected video display device (not shown) connected to receive the video signal from the Video Out Circuitry 44.

Alternatively, serial digital video data, or serial control signals from an attached computer system, can be input or output through high speed serial interface circuitry 46, as will be described in more detail below.

Support circuitry 48 and performs certain "housekeeping" and control functions. The Support circuitry 48 interacts with the EEPROM module 16 via a well-known I²C bus 50, handling interrupt signals, INT, and reset signals, RST, and programming an array of programmable I/O pins, PIO (not shown).

The EEPROM module 16 may be used to store machine code for the operation of the Processor circuitry 40. At start-up, the machine code can be transferred from the relatively slow EEPROM module 16 to the relatively fast processor memory device 18 for use by the Processor circuitry 40 during normal operations.

Figure 2:
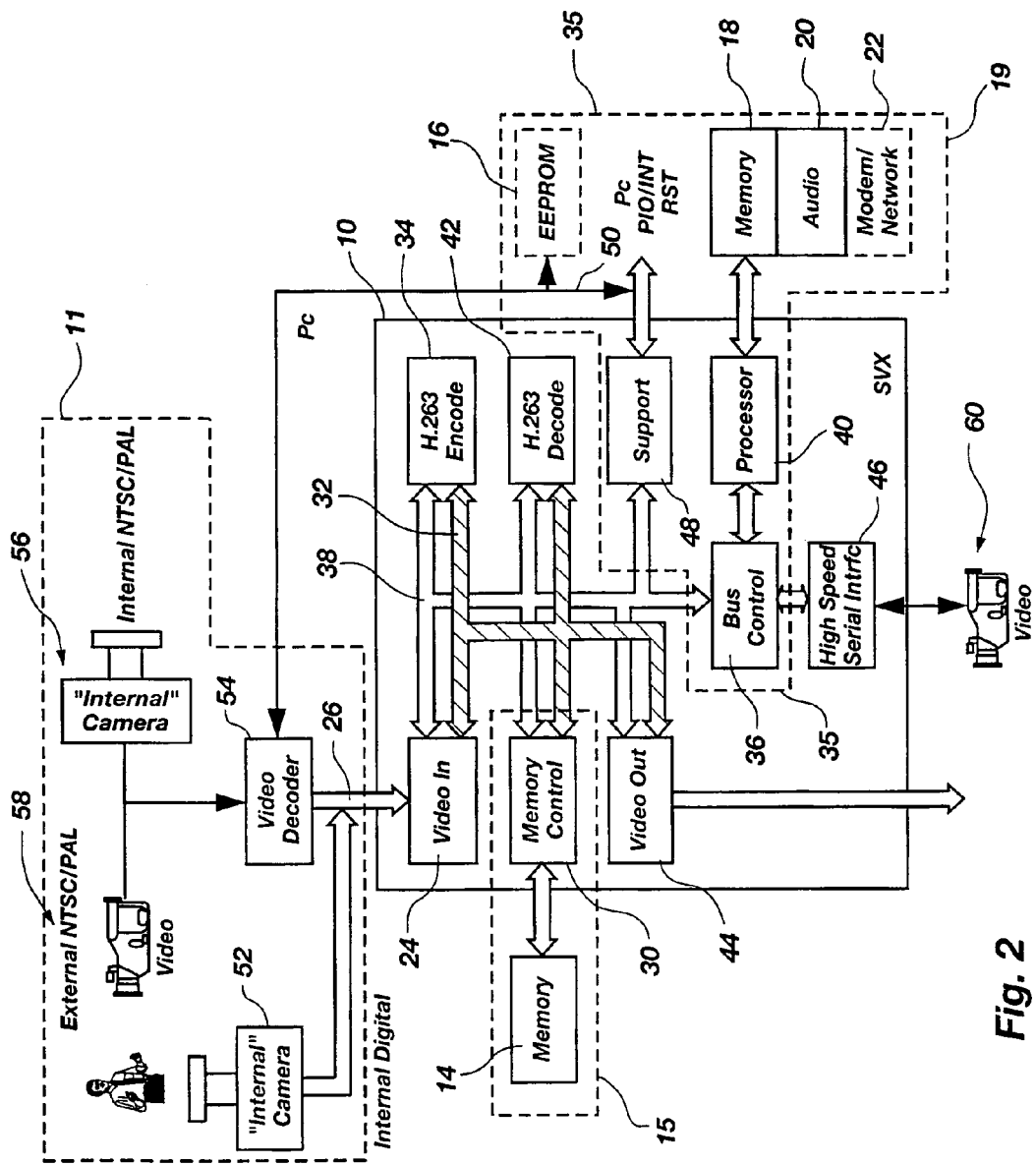
FIG. 2 is a block diagram of the ASIC suitable for use in one form of a video system of the present invention.

The system of the present invention shown in FIG. 2 incorporates a plurality of video input options supplied by video input means 11 the output of which is supplied as the input video signal 26. The input means 11 is here shown to include two or more sources of video signals. The sources illustrated include an Internal Digital Camera 52, an Internal NTSC or PAL video camera 56, an External NTSC or PAL video Camera 58. Input may also be had from an External High Speed Serial Camera 60. Although shown separated from the input means 11, the High Speed Serial Camera 60 can be incorporated into the input means 11 or positioned separately to supply an input signal to the data bus 38.

An "internal" camera 52 is a camera in which the lens and interface control are mounted inside the system enclosure, while an "external" camera interfaces through a connector which may be the video decoder 54.

More specifically, as shown in FIG. 2, the digital video signals 26 can be generated by the internal digital camera 52, or by the Video Decoder module 54 converting analog NTSC or PAL signals from the internal NTSC or PAL camera 56 or the external NTSC or PAL camera 58 to the digital video signals 26. Alternatively, or in addition, a digital camera 60 having a high speed serial output, such as a FireWire or USB port, can output serial digital video signals to the high speed serial interface 46 for further processing and transmission to the data bus 38.

The ASIC 10 of FIG. 2 is configured to have a memory means 15 that includes the DRAM 14 and the memory control 30. Memory control circuitry 30 transfers the digital video signals 26 from a memory bus 32 to the DRAM 14 for storage and also to the H.263 encode module 34 for compression prior to processing by the video processing means 35. The video processing means 35 includes the Processor 40 as well as the support circuit 48 and the bus control 36. It also includes the processor Memory 18 and the EEPROM 16 if provided.

The video processing means 35 and more specifically the Processor circuitry 40 directs the encoded digital video data to the remote interface circuit 19. The remote interface circuit 19 is any suitable circuit to transmit and receive video conferencing signals to and from a remote source. That is, the remote interface circuit 19 is configured to receive video signals and preferably voice signals from a remote source to effect what may be referred to as video conferencing. The outgoing video signals as well as audio signals are sent to a remote location which ideally is returning similar video signals and audio signals for processing by the ASIC and for presentation as a video signal on a selected video display or output device. The remote interface means 19 is here illustrated to include the MODEM 22 and Audio circuit 20.

The ASIC 10 of FIG. 2 has all the other processing circuitry of FIG. 1 as shown in FIG. 2 while at the same time differing significantly in that a plurality of video input arrangements can be accepted from the video input means 11 using a combination of software and hardware to facilitate speed in processing and flexibility.

Figure 3:
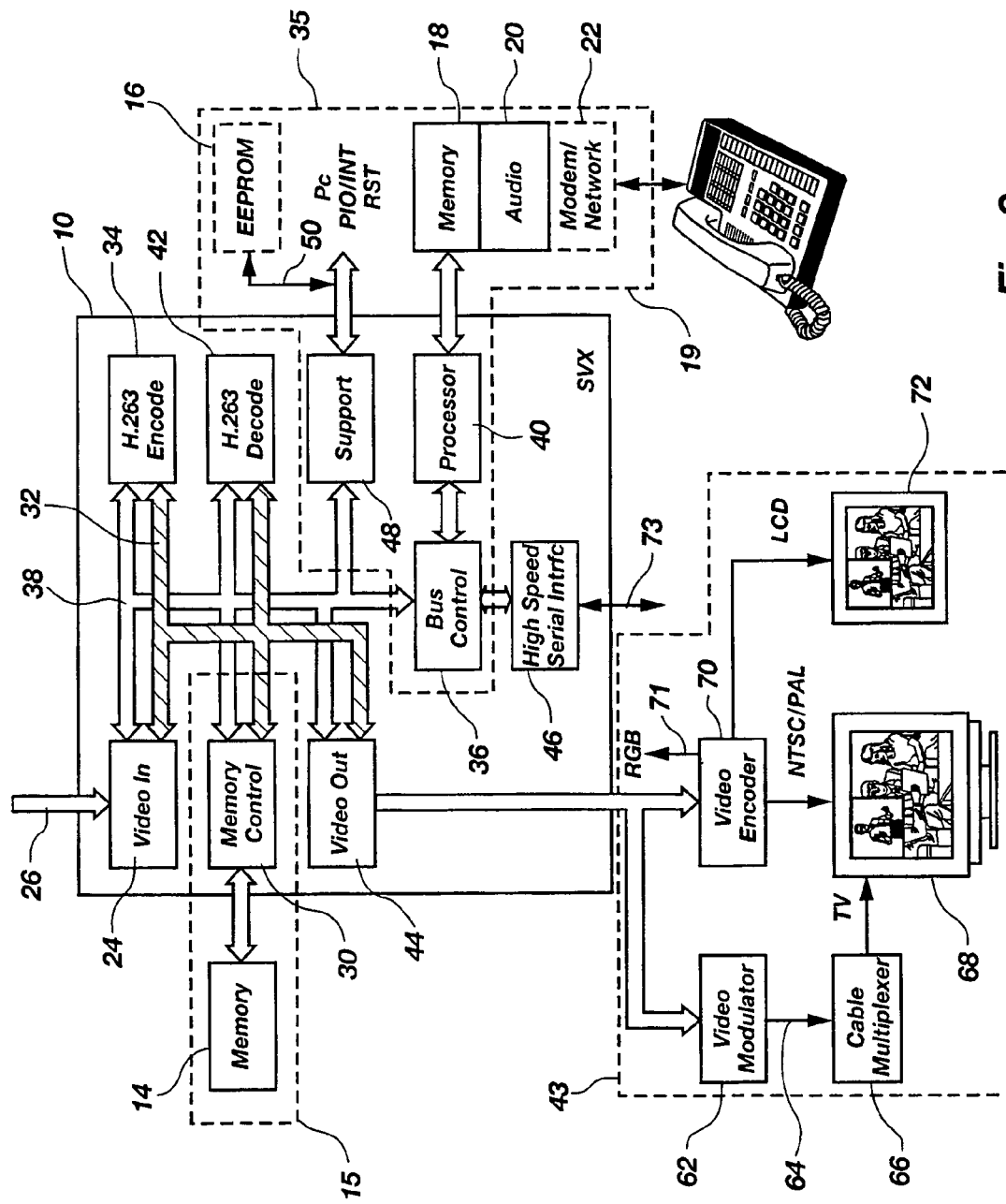
FIG. 3 is is a block diagram of the ASIC suitable for use in another form of a video system of the present invention.

The system of the present invention in another embodiment depicted in FIG. 3 may also integrate one of several video output options, including NTSC/PAL 68, a Video Modulator 62, LCD 72, RGB 71, and a remote device connected by conductors 73 through the High Speed Serial Interface 46.

More specifically, as shown in FIG. 3, the digital video output of the Video Out circuitry 44 can be provided to video output means 43 which is here shown to include a Video Modulator module 62 to convert the digital video output from the video out circuitry 44 to a modulated analog signal 64. The analog signal is then multiplexed by a Cable Multiplexer module 66 for output as a TV channel (e.g., channel "3") to a monitor 68. Alternatively, the digital video output of the Video Out circuitry 44 can be converted by a Video Encoder module 70 to an NTSC or PAL analog format suitable for input to a dedicated port on the monitor 68, or can be converted into an LCD format signal for an LCD screen 72. In still another alternative, the Video Encoder module 70 can convert the digital video output from the Video Out circuitry 44 to an RGB signal 71 suitable for direct application to a computer monitor (not shown).

The system of the present invention can be configured or modified through the specific use of the High Speed Serial Interface 46 connected to separate video 47 not illustrated in FIG. 3. The video means 47 (FIG. 4), can be used for video input, and/or video output. Additionally, it can be used to connect the system as a peripheral or remote device to another controller. This controller could be, for example, a cable box, a set top box, a personal computer, or any number of general purpose or task specific controller devices. Likewise, this also allows the system to easily be integrated directly into a stand-alone teleconferencing device or video phone.

Figure 4:
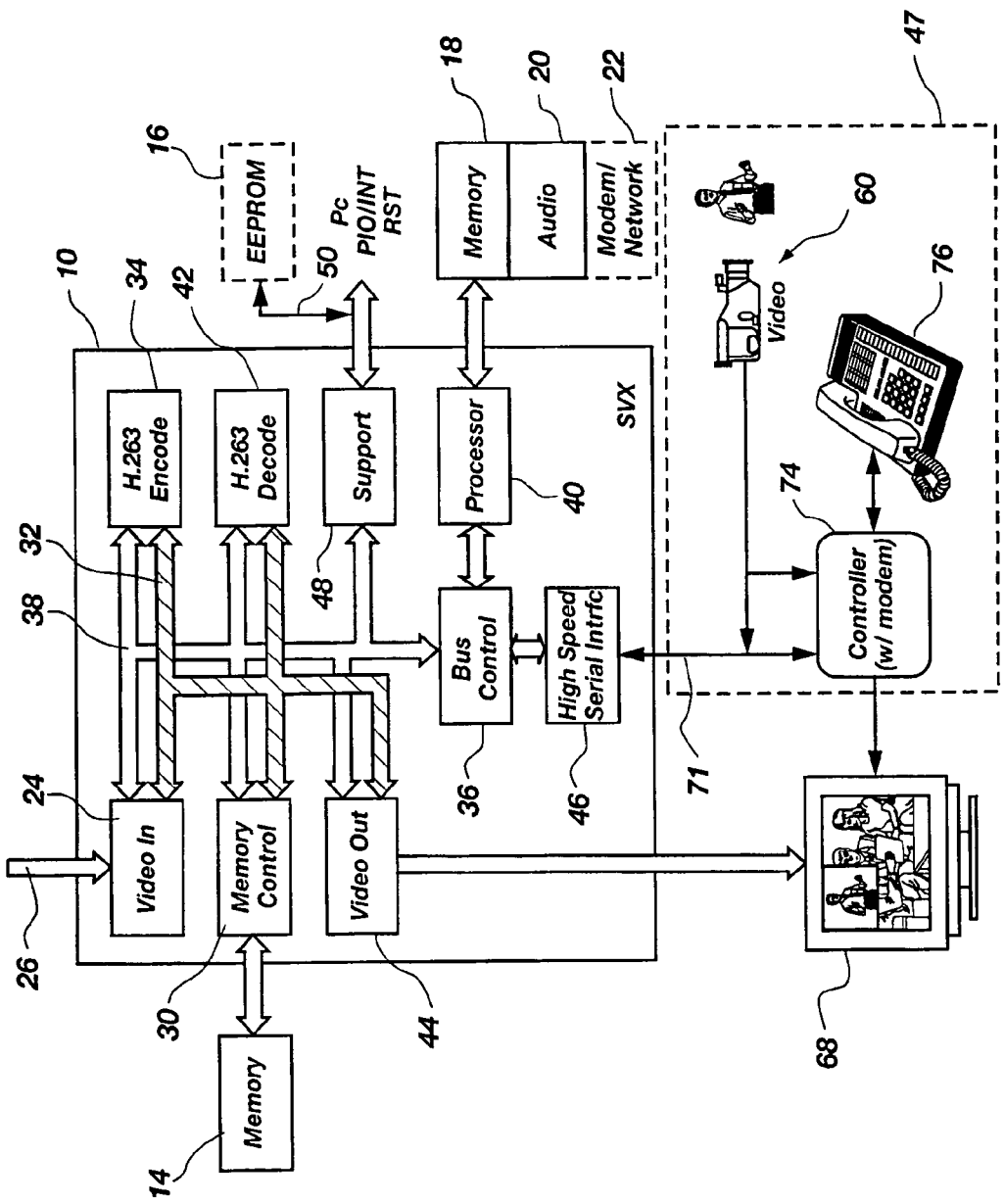
FIG. 4 is a block diagram of a high speed serial interface circuit for use with a video system of the present invention.

More specifically, as shown in FIG. 4, the depicted ASIC 10 has a High Speed Serial Interface circuit 46 (e.g., a FireWire or USB port) which outputs serial digital video data 71 to video means 47. The video means 47 may include a controller with modem 74, which then interfaces with the telephone system 76 or a separate monitor such as monitor 68.

Figure 5:
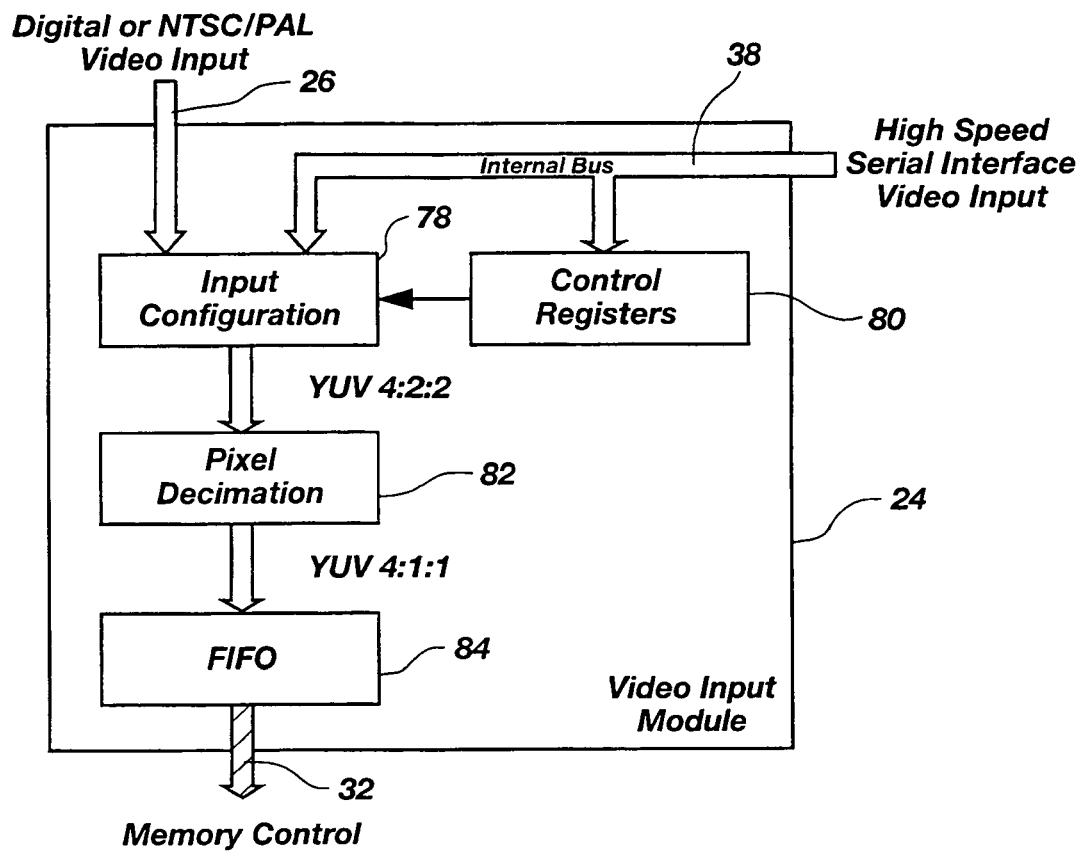
FIG. 5 is a block diagram of a video input block of an ASIC used with a video system of the present invention.

As shown in FIG. 5, the Video-In circuitry 24 includes Input Configuration circuitry 78 that receives digital video signals 26, as well as serial digital video data from the data bus 38. Control register circuitry 80 set by the Bus Control circuitry 36 (see FIG. 2) causes the Input Configuration circuitry 78 to select and output either the signals 26 or the data from the data bus 38 in a 4:2:2 YUV format. Pixel Decimation circuitry 82 then reduces the "color" component of the output signal, thereby reducing the data density of the signal, by outputting the signal in a 4:1:1 YUV format. Then, a First-In-First-Out (FIFO) buffer 84 holds the output signal before transferring it to the memory means 15 via memory bus 32.

Figure 6:
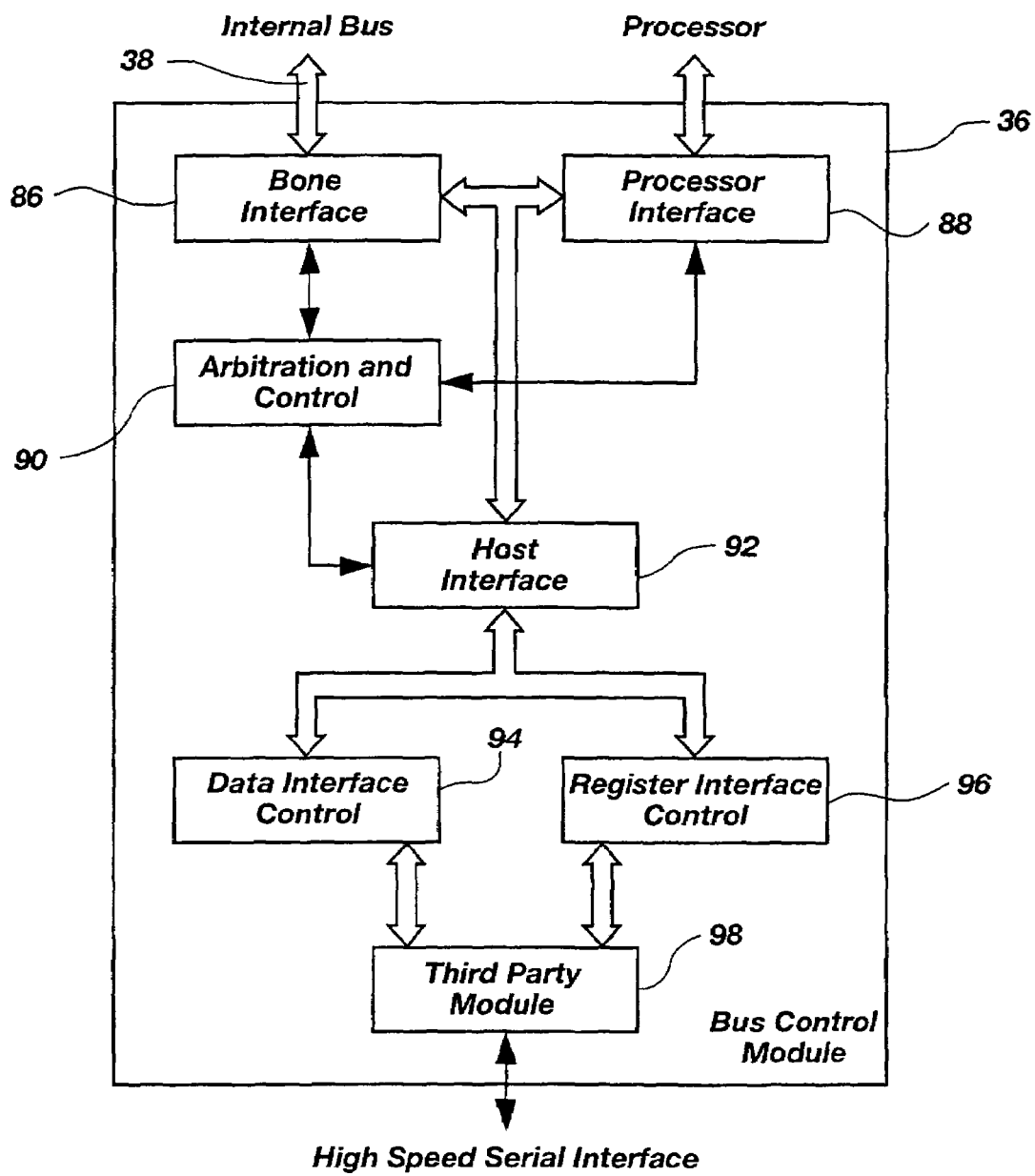
FIG. 6 is a block diagram of a bus control block of an ASIC used with a video system of the present invention.

As shown in FIG. 6, the Bus Control circuitry 36 includes Bone Interface circuitry 86 for receiving data from the data bus 38 (otherwise known as the "backbone") and Processor Interface circuitry 88 which communicates with the Processor circuitry 40 (see FIG. 4). Arbitration and Control circuitry 90 selects which Interface circuitry 86 and 88 will be active at any one time, and Host Interface circuitry 92 communicates data internally to and from the selected Interface circuitry 86 or 88. Data from the Host Interface circuitry 92 proceeds to Data Interface Control circuitry 94, while register information proceeds to Register Interface Control circuitry 96. Both of the circuitry 94 and 96 communicate with Third Party Module circuitry 98, such as FireWire or USB serial-to-parallel circuitry.

Figure 7:
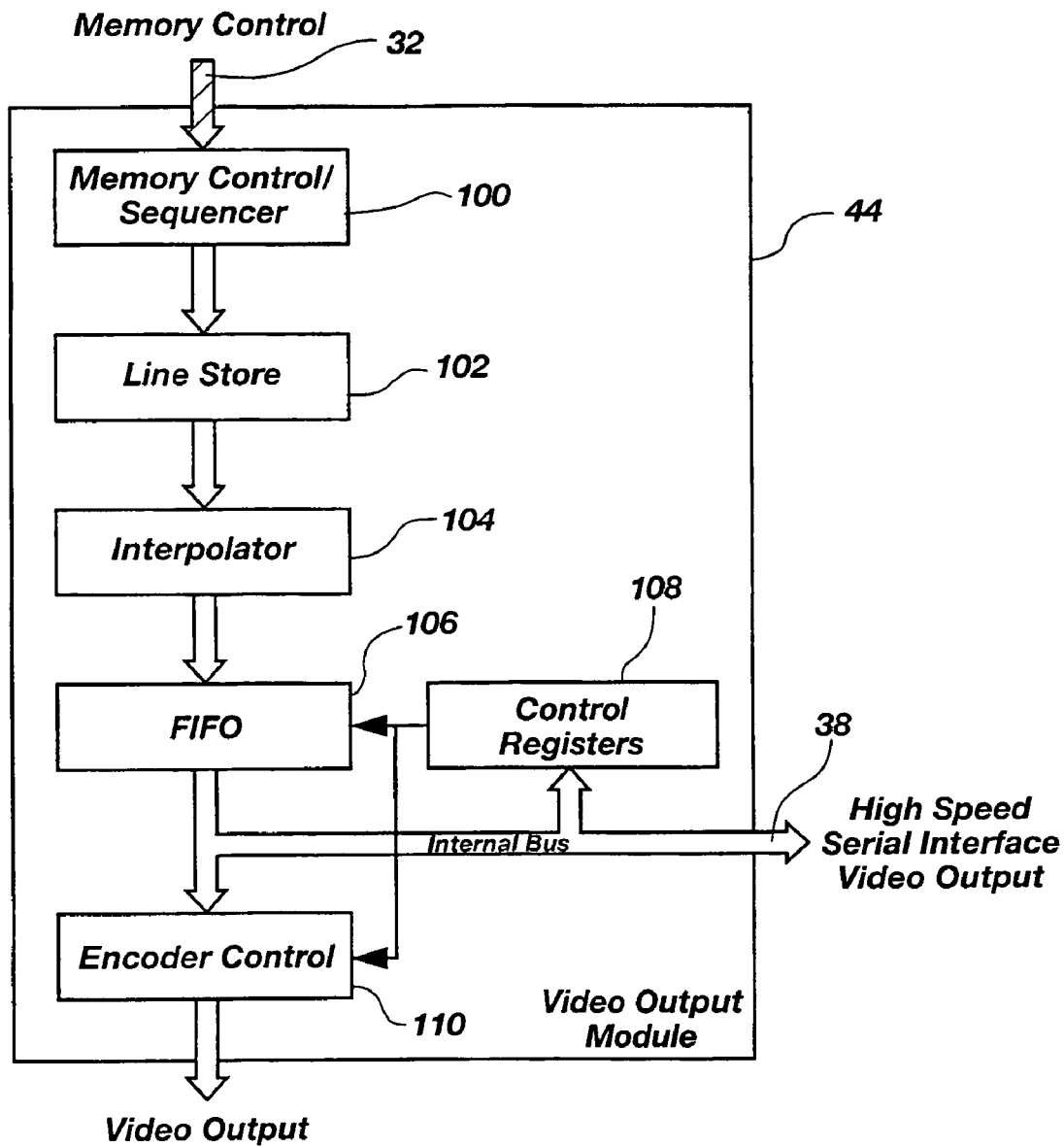
FIG. 7 is a block diagram of a video output block of an ASIC used with a video system of the present invention.

As shown in FIG. 7, the Video Out circuitry 44 includes Memory Control/Sequencer circuitry 100 that directs the Memory Control circuitry 30 (see FIG. 1) to provide it with digital video data from the Video Memory module 14 (see FIG. 1) in the proper sequence. Line Store circuitry 102 then acts as a buffer for storing the video data until two video lines of data are stored. Interpolator circuitry 104 then reverses the actions of the Pixel Decimation circuitry 82 (see FIG. 5) by interpolating between each two lines of video data it receives to generate a 4:2:2 YUV signal. A storage FIFO buffer 106 then stores the interpolated video data, and Control Registers circuitry 108 controlled by the Bus Control circuitry 36 (see FIG. 1) then causes Encoder Control circuitry 110 to output the stored video data, or not, as the situation may dictate. At the same time, the stored video data is provided on the data bus 38 to the Bus Control circuitry 36 (FIG. 1) for use by the High Speed Serial Interface circuitry 46 (see FIG. 1).

The systems of FIG. 2 or 3 can be easily and inexpensively configured as several different devices including, but not limited to: a PC peripheral for camera or video conferencing; a cable box peripheral for camera or video conferencing; and a remote camera for surveillance systems. In addition, the system that includes the circuit of FIG. 2 or 3 can be integrated into or tightly coupled with other hardware to create other devices including, but not limited to, a set top box video conferencing system; a cable box video conferencing system; and a video phone.

It should be understood, of course, that the systems depicted in FIGS. 2–7 may be a transmitting or receiving station, or, more likely in most video conferencing systems, both.

The embodiments herein illustrated and described are not intended to limit the scope of the invention as defined in the following claims.

What is claimed is:

1. A video conferencing circuit for use with a plurality of video input devices and a video output device, said video conferencing circuit comprising:

video input means configured to select an input video signal from one of a plurality of video signal generating devices, said video input means including a video decoder circuit to receive selected video signals and convert said selected video signals to an input video signal;

a remote interface circuit;

a video output device; and an application specific integrated circuit (ASIC) connected to said video input means, to said video output device and to said remote interface circuit, said ASIC having:

a high speed serial video input, a video-in circuit connected to said video input means to receive one of said input video signal from one of said plurality of video signal generating devices and said high speed serial video input, said video-in circuit including an input configuration circuit connected to receive one of a plurality of video input signals and a high speed serial video input, a control register connected to said video processing means to receive control signals therefrom and said input configuration circuit to supply input control signals to cause said input configuration circuit to operate to supply said one of said plurality of video input signals as said input video signal to said memory circuit, a memory circuit connected to said video-in circuit to receive said one of said input video signal and said high speed serial video input, said memory circuit being configured to retain and transmit said one of said input video signal and said high speed serial video input as stored data, data compression means connected to said memory circuit to receive said stored data and to compress said stored data through an encoding process to form outgoing compressed data, video processing means connected to receive said outgoing compressed data and connected to said remote interface circuit to transmit said outgoing compressed data and to receive incoming compressed data from a remote station, said video processing means also being connected to said video-in circuit, said memory circuit, said video decompression means, said video receiving means, and to said video image out means to control the flow of video signals thereinbetween, video decompression means connected to said video processing means to receive said incoming compressed data and configured to decompress and to transmit said incoming compressed data to said memory circuit, said memory circuit being configured to convert said incoming compressed data to incoming stored data, and video image out means connected to receive incoming stored data from said memory circuit and to transmit said incoming stored data as a video image signal to a video display device;

wherein said memory circuit includes a memory structure and a memory control circuit to convert said one of said input video signal and said high speed serial video input to stored data and to convert said incoming compressed data to incoming stored data and wherein said output of said input configuration circuit is supplied to a decimation circuit which operates to reduce the density of the said output signal and is connected to a buffer to store and transmit an output which is a video.

2. The video conferencing circuit of claim 1 wherein said remote interface circuit includes a modem.

3. The video conferencing circuit of claim 1 wherein said memory structure is a DRAM configured to receive and store said stored data and said incoming stored data.

4. The video conferencing circuit of claim 1 further including a data bus interconnected between said video-in circuit, said memory circuit, said encoding circuit, said decoding circuit and said video out circuit for transmitting control signals therebetween, and wherein said video processing means includes a bus control circuit connected to said data bus to supply said control signals thereto.

5. The video conferencing circuit of claim 4 wherein said bus control circuit includes a backbone interface circuit connected to said data bus, said backbone interface circuit being configured to generate and to supply said control signals to said data bus.

6. The video conferencing circuit of claim 5 wherein said video processing means includes a data processor connected to said remote interface circuit, a processor interface connected to said data processor to supply data thereto and a arbitration and control circuit connected to said processor interface and to said backbone interface circuit and configured to select and activate one of the backbone interface circuit and the processor interface, and a host interface circuit connected to said arbitration and control circuit, said host interface circuit being configured to supply to and receive data from the processor interface and the backbone interface circuit, said arbitration and control circuit also being connected to supply and receive video signals to and from an external device for obtaining and displaying video images.

7. A video conferencing circuit for use with a plurality of video output devices and a video input device, said video conferencing circuit comprising:

video output means configured to select one of a plurality of video output devices to receive an output video signal;

a remote interface circuit;

a video input device; and an application specific integrated circuit (ASIC) connected to said video input device, to said video output means and to said remote interface circuit, said ASIC having:

a high speed serial video inputs a video-in circuit connected to said video input device to receive one of a video input signal from said video input device and said high speed serial video input, a memory circuit connected to said video-in circuit to receive said one of said video input signal and said high speed serial video input, said memory circuit being configured to retain and transmit said one of said video input signal and said high speed serial video input as stored data, data compression means connected to said memory circuit to receive said stored data and to compress said stored data through an encoding process to form outgoing compressed data, video processing means connected to receive said outgoing compressed data and connected to said remote interface circuit to transmit said outgoing compressed data and to receive incoming compressed data from a remote station, video decompression means connected to said video processing means to receive said incoming compressed data and configured to decompress and to transmit said incoming compressed data to said memory circuit, said memory circuit being configured to convert said incoming compressed data to incoming stored data, said video processing means also being connected to said video-in circuit, said memory circuit, said video decompression means, said video receiving means, and to said video image out means to control the flow of video signals thereinbetween, and video image out circuit connected to receive incoming stored data from said memory circuit and to transmit said incoming stored data as a video image signal to said one of said plurality of video output devices of said video output means;

wherein said memory circuit includes a memory structure and a memory control circuit to convert said one of said video input signals and said high speed serial video input to stored data and to convert said incoming compressed data to incoming stored data;

wherein said video-in circuit includes an input configuration circuit connected to receive said video input signal and said high speed serial video input, a control register connected to said video processing means to receive control signals therefrom and said input configuration circuit to supply input control signals to cause said input configuration circuit to operate to supply said one of said video input signal and said high speed serial video input to said memory circuit; and wherein said output of said input configuration circuit is supplied to a decimation circuit which operates to reduce the density of the said output signal and is connected to a buffer to store and transmit an output which is a video.

8. The video conferencing circuit of claim 7 wherein said remote interface circuit includes a modem.

9. The video conferencing circuit of claim 7 wherein said memory structure is a DRAM configured to receive and store said stored data and said incoming stored data.

10. The video conferencing circuit of claim 7 further including a data bus interconnected between said video-in circuit, said memory circuit, said encoding circuit, said decoding circuit and said video out circuit for transmitting control signals therebetween, and wherein said video processing means includes a bus control circuit connected to said data bus to supply said control signals thereto.

11. The video conferencing circuit of claim 10 wherein said bus control circuit includes a backbone interface circuit connected to said data bus, said backbone interface circuit being configured to generate and to supply said control signals to said data bus.

12. The video conferencing circuit of claim 11 wherein said video processing means includes a data processor connected to said remote interface circuit, a processor interface connected to said data processor to supply data thereto and a arbitration and control circuit connected to said processor interface and to said backbone interface circuit and configured to select and activate one of the backbone interface circuit and the processor interface, and a host interface circuit connected to said arbitration and control circuit, said host interface circuit being configured to supply to and receive data from the processor interface and the backbone interface circuit.

13. A video conferencing circuit for use with a plurality of video output devices and a video input device, said video conferencing circuit comprising:
  video output means configured to select one of a plurality of video output devices to receive an output video signal;
  a remote interface circuit;
  a video input device; and
  an application specific integrated circuit (ASIC) connected to said video input device, to said video output means and to said remote interface circuit, said ASIC having:
    a high speed serial video input,
    a video-in circuit connected to said video input device to receive one of a video input signal from said video input device and said high speed serial video input,
    a memory circuit connected to said video-in circuit to receive said one of said video input signal and said high speed serial video input, said memory circuit being configured to retain and transmit said one of said video input signal and said high speed serial video input as stored data,
    data compression means connected to said memory circuit to receive said stored data and to compress said stored data through an encoding process to form outgoing compressed data,
    video processing means connected to receive said outgoing compressed data and connected to said remote interface circuit to transmit said outgoing compressed data and to receive incoming compressed data from a remote station,
    video decompression means connected to said video processing means to receive said incoming compressed data and configured to decompress and to transmit said incoming compressed data to said memory circuit, said memory circuit being configured to convert said incoming compressed data to incoming stored data, said video processing means also being connected to said video-in circuit, said memory circuit, said video decompression means, said video receiving means, and to said video image out means to control the flow of video signals thereinbetween,
    video image out circuit connected to receive incoming stored data from said memory circuit and to transmit said income to transmit said incoming stored data as a video image signal to said one of said plurality of video output devices of said video output means,
    a memory control sequencer connected to said memory circuit, said memory control sequencer being configured to generate and send to the memory circuit instructions to cause the supply said memory circuit to supply said memory control sequencer with said incoming stored data and said memory control sequencer being configured to supply said incoming stored data as an output,
    a line buffer connected to receive said incoming stored data from said memory control sequencer, said line buffer being configured to store a video line of said incoming stored data as first video out signal and another video line of said stored video data as a second video out signal,
    an interpolator circuit connected to said line buffer to receive said first video out signal and said second video out signal and to generate an interpolated video signal,
    a buffer connected to said interpolator circuit to receive said interpolated video signal therefrom,
    a control register connected to said data bus to receive control signals from said video processing control and to said buffer to supply signals to cause said buffer to supply said interpolated video signal, and
    an encoder connected to said buffer to receive said interpolated video signal therefrom and to said control register to receive signals to cause said interpolated video signal to be supplied as the video image signal to one of said plurality of video output devices of said video output means,
    wherein said memory circuit includes a memory structure and a memory control circuit to convert said one of said video input signals and said high speed serial video input to stored data and to convert said incoming compressed data to incoming stored data.

* * * * *